April 5, 1955  H. BEHRMANN  2,705,373
MECHANICAL PRECISION EXTENSOMETER
Filed June 18, 1954

INVENTOR
Herwart Behrmann
by F. D. Rapp
Att'y.

United States Patent Office 2,705,373
Patented Apr. 5, 1955

2,705,373

MECHANICAL PRECISION EXTENSOMETER

Herwart Behrmann, Berlin-Nikolassee, Germany, assignor to Askania-Werke A. G., Berlin-Friedenau, Germany Application June 18, 1954, Serial No. 437,641

Claims priority, application Germany June 20, 1953

2 Claims. (Cl. 33—147)

This invention relates to a mechanical precision extensometer for measuring deformations, usually of small magnitude, in a specimen whereto the instrument is attached.

Instruments of this general type are known to the art. They usually contact the specimen to be measured by a pair of feet, one of which is movable. The movement of the movable foot is transmitted by leverage with suitable magnification to a pointer, playing over a dial.

The known instruments of such type are rather large and heavy. Their attachment to the specimen requires large clamping forces. This, as well as the conventional, exposed or cumbersome arrangement of the lever and pointer mechanism, often interferes with practical application of the instrument and invites injuries to the operating parts. In order to obtain the required magnification pointers have been used which occupied almost the entire height of the extensometer. A dial for such a pointer can have only a limited length, thereby limiting the total measuring stroke. In order to add to the stroke, adjustment devices are often used on the pointers of such instruments; however, their use tends to shift the instrument, thereby making the benefit of the adjustment means very questionable.

The art also knows mechanical tension balances for longer measuring strokes, usually indicating with slight magnification. Such instruments have been provided with gear wheel transmissions between the lever carrying the movable foot and a pointer playing over a circular dial. Conventional circular measuring scales have been used for this purpose, the feeler of the scale being mechanically connected with the movable lever. However the known arrangements of this type are unsuitable for precision extensometers since they and mainly their circular scales would make the instruments entirely too heavy and too large.

It is a primary object of this invention to provide a precision extensometer combining the advantages of such precision instruments as heretofore known—compactness, sensitivity, etc.—with those of the known tension balances—use of circular scales, avoidance of exposed parts, etc.—while avoiding the drawbacks of each device as heretofore known.

This has been achieved by an arrangement wherein the movement of the movable foot is basically transmitted, with large magnification, by means of a first bar or transmission lever and a gear wheel drive cooperating therewith, to a second bar or pointer playing over a circular scale; motion being transmitted from the transmission lever to the first gear wheel or segment thereof by means of a pusher secured to those parts by leaf spring joints and the last gear wheel, carrying the pointer, being torsionally preloaded by a spiral spring.

By means of these expedients a precision extensometer has been contributed to the art which provides minute overall dimensions, large magnification, unshiftable indication, a practically unlimited measuring stroke and an unlimited dial.

The details will best be explained in connection with the description of a preferred embodiment of the new instrument which follows:

Figure 1:
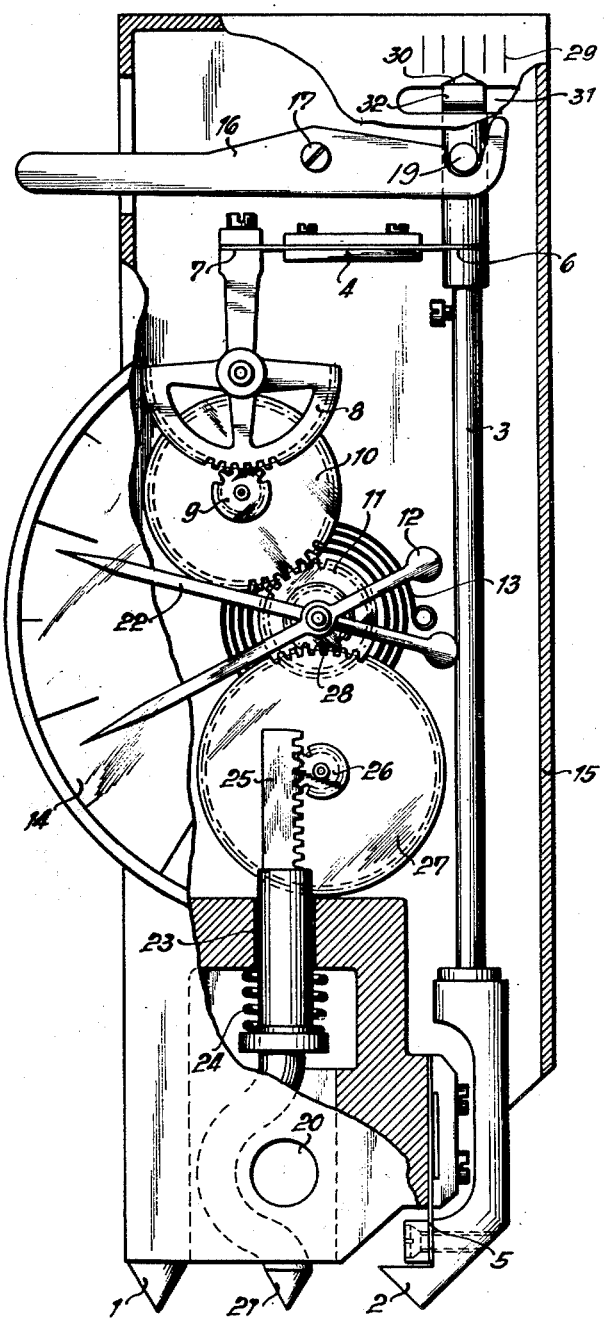
Figure 1 is an enlarged front view of the preferred embodiment, with certain parts broken away to disclose the mechanism.

The instrument has a stationary foot 1 and a movable foot 2 both formed in known manner as sharp pointed or particularly knife-edged parts. The movable foot 2 is rigid with a transmission lever 3 arranged to magnify the movement of the pointed end of the foot at a ratio such as 1:10 and carrying at the free end opposite the foot a pusher rod 4. A leaf spring joint 5 substantially oriented in the plane of pressure acting upon the movable foot 2 connects the lever 3 with the instrument in a manner practically free from play and friction. Similarly leaf spring joints 6 and 7 lying in positions in line with the pusher at both ends thereof and at right angles with the lever 3 connect said lever with a gear segment 8 forming the first part of a gear wheel drive. A pinion 9 rigid with a gear wheel 10 transmits the motion of the segment to a gear wheel 11 carrying the pointer 12. This last gear wheel 11 of the gear transmission is preloaded in one torsional direction by a spiral spring 13 so as to eliminate any backlash between the gears and thereby to guarantee high accuracy of indication.

The pointer 12 plays in front of a circular dial 14 which may for instance have 100 graduations. It is desirably protected by a watch crystal in front of the scale. A box-shaped housing 15 completely surrounds the transmission lever 3, pusher 4 and set of gear wheels 8, 9, 10, 11. Thus the instrument is entirely unaffected by manipulation incident to its application to specimens of any type and position.

The dial 14 is frictionally held in a circular enlargement of the housing 15 wherein it can be rotated about its center, thereby guaranteeing convenient meter reading even if the extensometer lies horizontally or inclined when clamped to the specimen. Suitable numbers or other legends connected with the graduations (not shown) can be imprinted upon the dial to facilitate the determination of pointer movements. The exact location on the dial from which the pointer starts is immaterial so long as its numerical value is properly deducted from the final pointer position. The pointer may rotate over the dial a number of times during a measuring stroke. In view of these arrangements it is unnecessary to provide any adjustment of the pointer, the scale being endless.

The number of times that the pointer rotates is most conveniently indicated by a pointer secured to the first bar or transmission lever 3, which in this manner becomes a primary indicator. For this purpose a small straight scale 29 is provided at the top end of the housing 15 and the upper free end of the transmission lever 3 carries an indicator 30, extending through a window 31 in the housing 15 by means of a carrier 32 and movable along the scale 29.

Figure 2:
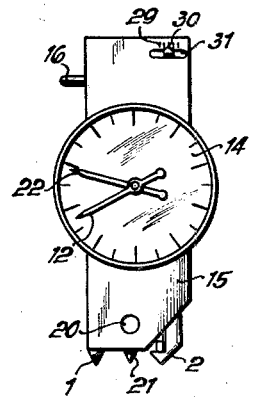
Figure 2 is a front view of the same instrument in approximately actual size.

It is further desirable to provide means to arrest movements of the transmission lever. For instance this can be achieved by a small, frictionally movable two-arm lever which engages a pin secured to the free end of the transmission lever when arresting the latter. Such a lever is shown at 16, with a pivot at 17. The right arm of this lever has a notch 18 adapted to engage a pin 19 on the free end of the transmission lever 3 to arrest the latter. In order to release the arresting device the operator simply raises the left end of the lever 16 as will be clear from Figure 2.

The entire instrument is clamped to the specimen by conventional clamping means, not shown, which may engage the housing 15 through apertures 20 between the feet 1 and 2.

An additional feature, known by itself, can be combined with the invention by providing a feeler between the measuring feet in order to measure bending deformations of the specimen. Such simultaneous measurement of bending deformations is known to be required for the proper interpretation of strain measurements on easily deformable parts such as thin sheet material, tubes and the like. Without registration of the bending, if any, which may accompany the longitudinal strain no pattern of stress reaction is usually recognizable. Such pattern however can be reconstructed upon simultaneous measurement of bend curvatures in the area of strain measurements. The curvature is determined by a feeler positioned between feet 1 and 2 and movable at right angles to the surface of the specimen. The movements of this feeler can be read without an additional dial, thereby making the instrument particularly compact. For this purpose it is merely necessary to utilize concentric shafts, as usual in watches. The feeler 21 may thus cooperate with a third bar or auxiliary pointer 22 playing over the same dial 14 which serves the main pointer 12. For this purpose the feeler has a plunger extending through a bearing 23 in the housing 15 and outwardly loaded by a compression spring 24, while carrying at the top end a rack 25 in mesh with a pinion 26. The rotation of this pinion, by means of a gear 27 rigid therewith is transmitted to a gear 28 carrying the pointer 22. The latter pointer is shown in back of the first, thereby indicating that the shaft of the latter pointer is hollow, but of course the opposite arrangement can also be used.

A number of further modifications are possible.

I claim:

1. A mechanical precision extensometer for relatively short measuring strokes to be indicated with great enlargement, comprising a housing; a foot rigid with the housing; a foot movable relative to the housing; a transmission lever and primary indicator rigid with the movable foot and adapted to obtain a first magnification of the movement of the foot and to indicate the magnified movement; a scale on the outside of the housing, adapted to cooperate with the primary indicator to indicate the magnified movement; a train of gear wheel members arranged for further stroke magnification; a pusher between the free end of the lever and the first member of said train, the pusher being secured to the lever and the first member by a pair of spring joints; a circular dial in said housing; a second indicator and pointer carried by the last member of said train and rotatable over said dial; and elastic means preloading said last member and pointer in one torsional direction; said scale being so arranged as to indicate the number of times that said pointer rotates over said dial.

2. An extensometer as described in claim 1 additionally comprising a feeler disposed between the two feet and means controlled by the feeler, adapted to indicate bending deformations of the specimen to which the extensometer is attached, said means comprising a third indicator and pointer having a shaft co-axial with that of the second indicator and pointer and rotatable over said dial.

References Cited in the file of this patent

UNITED STATES PATENTS

| | | |
|---|---|---|
| 283,627 | Logan | Aug. 21, 1883 |
| 595,865 | Reisner | Dec. 21, 1897 |
| 802,470 | Picard | Oct. 24, 1905 |
| 1,056,186 | Laplant | Mar. 18, 1913 |
| 1,884,073 | Metzger | Oct. 25, 1932 |
| 1,999,075 | Bauer et al. | Apr. 23, 1935 |
| 2,177,605 | Whittemore | Oct. 24, 1939 |
| 2,278,194 | Donnell | Mar. 31, 1942 |

FOREIGN PATENTS

| | | |
|---|---|---|
| 112,232 | Switzerland | Oct. 16, 1925 |
| 251,163 | Switzerland | July 16, 1948 |